US012683390B2

(12) United States Patent
Mitani

(10) Patent No.: US 12,683,390 B2
(45) Date of Patent: Jul. 14, 2026

(54) POWER SUPPLY SYSTEM AND MOVING OBJECT

(71) Applicant: HONDA MOTOR CO., LTD., Tokyo (JP)

(72) Inventor: Manabu Mitani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/018,022

(22) Filed: Jan. 13, 2025

(65) Prior Publication Data

US 2025/0246904 A1 Jul. 31, 2025

(30) Foreign Application Priority Data

Jan. 29, 2024 (JP) ................................. 2024-010663

(51) Int. Cl.
*H02J 1/08* (2026.01)
*B64C 29/00* (2006.01)

(52) U.S. Cl.
CPC .......... *H02J 1/084* (2020.01); *B64C 29/0091* (2013.01)

(58) Field of Classification Search
CPC ...................................................... H02J 1/084
USPC .................................................... 307/9.1, 66
See application file for complete search history.

(56) References Cited

U.S. PATENT DOCUMENTS

| | | | |
|---|---|---|---|
| 4,551,632 A | 11/1985 | Jourdan et al. | |
| 2021/0399942 A1* | 12/2021 | Yasunori | ............. B60R 16/0232 |
| 2023/0238643 A1 | 7/2023 | Hong et al. | |
| 2023/0336087 A1* | 10/2023 | Kitazawa | ................ B60L 58/00 |

FOREIGN PATENT DOCUMENTS

| | | |
|---|---|---|
| CN | 218513525 U | 2/2023 |
| JP | 06-003975 B2 | 1/1994 |
| JP | 2023-538319 A | 9/2023 |

* cited by examiner

*Primary Examiner* — Daniel Kessie
*Assistant Examiner* — Dru M Parries
(74) *Attorney, Agent, or Firm* — Rankin, Hill & Clark LLP

(57) ABSTRACT

A power supply system includes a power storage device, a power supply circuit for supplying DC power from the power storage device to a load device, and a containment member for accommodating the power storage device. The power supply circuit includes a positive wire and a negative wire, a first switch provided on the positive wire, and a second switch provided on the negative wire. One of the first switch or the second switch is disposed in the interior of the containment member, and another one of the first switch or the second switch is disposed on the exterior of the containment member.

8 Claims, 10 Drawing Sheets

Figure 2:
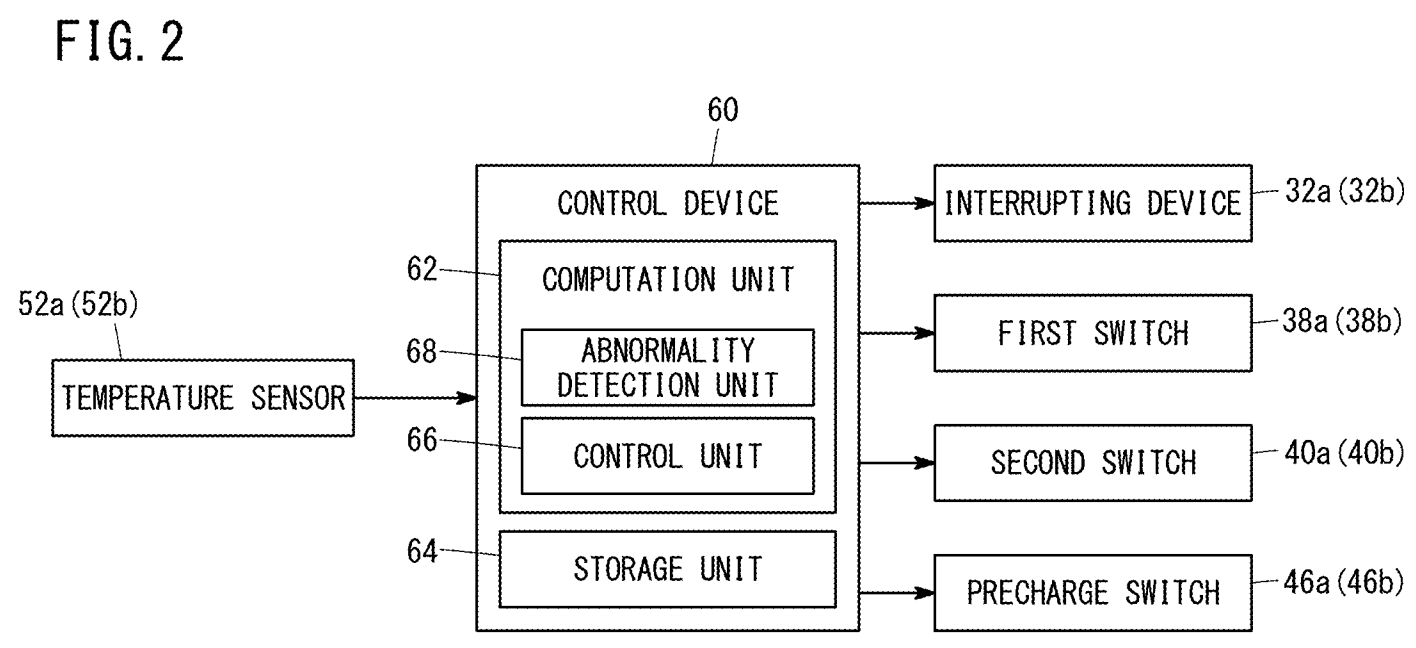

CONTROL DEVICE — 60

COMPUTATION UNIT — 62

ABNORMALITY DETECTION UNIT — 68

CONTROL UNIT — 66

STORAGE UNIT — 64

TEMPERATURE SENSOR — 52a (52b)

INTERRUPTING DEVICE — 32a (32b)

FIRST SWITCH — 38a (38b)

SECOND SWITCH — 40a (40b)

PRECHARGE SWITCH — 46a (46b)

(SYSTEM START-UP
PREPARATION PROCESS)
<u>10</u>

(SYSTEM START-UP PROCESS)

(COMPARATIVE EXAMPLE)

(COMPARATIVE EXAMPLE)

FIG. 10

POWER SUPPLY SYSTEM AND MOVING OBJECT

CROSS-REFERENCE TO RELATED APPLICATIONS

This application is based upon and claims the benefit of priority from Japanese Patent Application No. 2024-010663 filed on Jan. 29, 2024, the contents of which are incorporated herein by reference.

BACKGROUND OF THE INVENTION

Field of the Invention

The present disclosure relates to a power supply system and a moving object.

Description of the Related Art

In recent years, research and development have been conducted on electrification technology that contributes to energy efficiency in order to ensure that more people have access to affordable, reliable, sustainable and modern energy. JP H06-003975 B2 discloses a power supply system for an aircraft. The power supply system includes a power supply circuit that supplies DC power from a power storage device to a load device.

SUMMARY OF THE INVENTION

There has been a demand for a more satisfactory power supply system and a more satisfactory moving object. The present invention has the object of solving the aforementioned problem.

According to a first aspect of the present disclosure, there is provided a power supply system comprising: a power storage device; a power supply circuit configured to supply direct current power from the power storage device to a load device; and a containment member configured to accommodate the power storage device, wherein the power supply circuit includes: a positive wire and a negative wire; a first switch provided on the positive wire; and a second switch provided on the negative wire, and one of the first switch or the second switch is disposed in an interior of the containment member, and another one of the first switch or the second switch is disposed on an exterior of the containment member.

According to a second aspect of the present disclosure, there is provided a moving object comprising the power supply system according to the first aspect.

According to the present disclosure, a more satisfactory power supply system and a more satisfactory moving object can be provided.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 2 is a control block diagram of a control device;

FIG. 10 is a schematic diagram of a moving object.

DETAILED DESCRIPTION OF THE INVENTION

In a power supply system, a power supply circuit includes a positive wire, a negative wire, a first switch provided on the positive wire, and a second switch provided on the negative wire. Further, the power supply system may include a containment member that accommodates a power storage device. For example, the containment member prevents a fire that has occurred in the power storage device from spreading to the exterior of the containment member. In a case where the first switch and the second switch are disposed in the interior of such a containment member, for example, when a fire occurs in the interior of the containment member, the whole of the power storage device, the first switch, and the second switch may be lost. In addition, the size of the power supply system is likely to be relatively large. The present disclosure has been made in view of such a problem, and can provide a power supply system and a moving object with which the number of components that are lost when an abnormality such as a fire occurs in the interior of a containment member can be reduced, and the size of the power supply system can be made relatively small.

Figure 1:
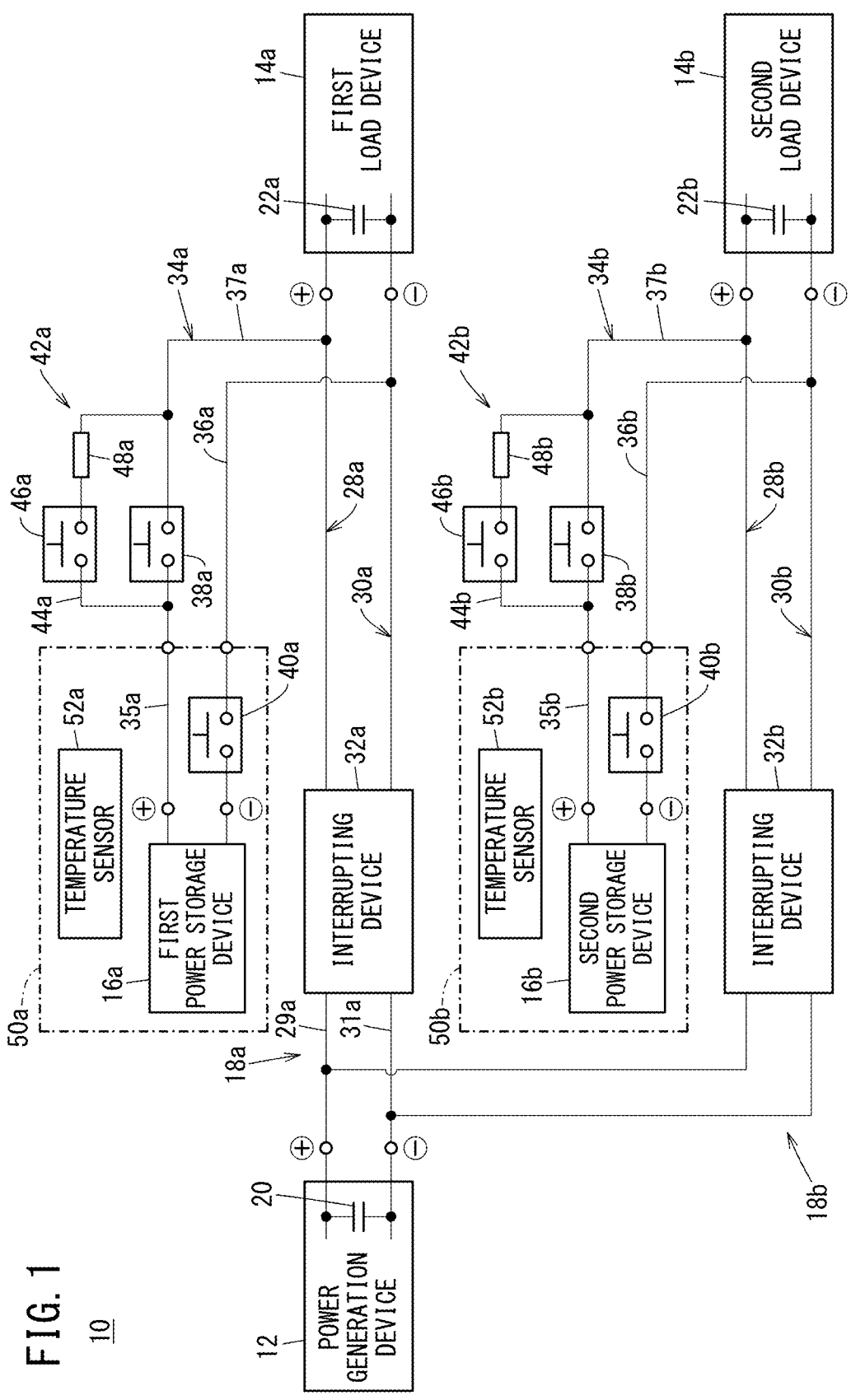
FIG. 1 is a schematic diagram of a power supply system according to an embodiment of the present invention.

A power supply system 10 and a moving object 200 according to an embodiment of the present disclosure will be described below with reference to the drawings. FIG. 1 is a schematic diagram of the power supply system 10. As shown in FIG. 1, the power supply system 10 includes a power generation device 12, a first load device 14a, a first power storage device 16a, a first power supply circuit 18a, a second load device 14b, a second power storage device 16b, and a second power supply circuit 18b.

The power generation device 12 includes, for example, an engine, a generator, and a power control unit. It should be noted that these components of the power generation device 12 are not shown in the drawing. The engine drives the generator. The generator generates three-phase AC power. The power control unit converts the three-phase AC power into DC power. The power generation device 12 includes a smoothing capacitor 20 on the output side of the DC power. The smoothing capacitor 20 is charged (precharged) when the power supply system 10 is started. The power generation device 12 may include a plurality of the smoothing capacitors 20.

The power generation device 12 may include components (for example, various sensors, a fuse, a relay, a breaker, a diode, a transistor, a resistor, a coil, a capacitor, and the like) other than the above-described components, but the description thereof will be omitted here.

The first load device 14a includes, for example, an inverter and an electric motor. It should be noted that these components of the first load device 14a are not shown in the drawing. The inverter converts input DC power into three-phase AC power. The electric motor is driven by the three-phase AC power.

The first load device 14a may further include, for example, a DC/DC converter and a low-voltage drive device. The DC/DC converter lowers the voltage of DC power input to the DC/DC converter. The low-voltage drive device is driven by the DC power output from the DC/DC converter. The first load device 14a includes a smoothing capacitor 22a on the input side of the DC power. The smoothing capacitor 22a is charged (precharged) when the power supply system 10 is started. The first load device 14a may include a plurality of the smoothing capacitors 22a.

The first load device 14a may include components (for example, various sensors, a fuse, a relay, a breaker, a diode, a transistor, a resistor, a coil, a capacitor, and the like) other than the above-described components, but the description thereof will be omitted here.

The first power storage device 16a includes, for example, a lithium ion battery. The first power storage device 16a may include a secondary battery other than the lithium ion battery. The first power storage device 16a may include a large-capacity capacitor.

A fuse (not shown) for interrupting a short-circuit current when the short-circuit current flows between a first positive wire 34a and a first negative wire 36a, which will be described later, may be provided inside the first power storage device 16a. Instead of the fuse, an element having a sufficient breaking current capacity (for example, a pyro-switch or the like) may be provided inside the first power storage device 16a. The first power storage device 16a may include components (for example, various sensors, a fuse, a relay, a breaker, a diode, a transistor, a resistor, a coil, a capacitor, and the like) other than the above-described components, but the description thereof will be omitted here.

The first power supply circuit 18a supplies DC power from the power generation device 12 to the first load device 14a. The first power supply circuit 18a supplies DC power from the first power storage device 16a to the first load device 14a.

The first power supply circuit 18a includes a first positive power line 28a, a first negative power line 30a, and an interrupting device 32a. The first positive power line 28a electrically connects the positive terminal of the power generation device 12 and the positive terminal of the first load device 14a. The first negative power line 30a electrically connects the negative terminal of the power generation device 12 and the negative terminal of the first load device 14a. The interrupting device 32a includes a pair of switches (not shown). One of the switches of the interrupting device 32a is provided on the first positive power line 28a. The other of the switches of the interrupting device 32a is provided on the first negative power line 30a. The interrupting device 32a may include components (for example, various sensors, a fuse, a relay, a breaker, a diode, a transistor, a resistor, a coil, a capacitor, and the like) other than the above-described components, but the description thereof will be omitted here.

The first power supply circuit 18a further includes the first positive wire 34a, the first negative wire 36a, a first switch 38a, a second switch 40a, and a precharge circuit 42a. The first positive wire 34a electrically connects the positive terminal of the first power storage device 16a and the first positive power line 28a. The first negative wire 36a electrically connects the negative terminal of the first power storage device 16a and the first negative power line 30a.

The first switch 38a is provided on the first positive wire 34a. The second switch 40a is provided on the first negative wire 36a. The precharge circuit 42a precharges the smoothing capacitor 22a provided in the first load device 14a. The precharge circuit 42a is connected to the first positive wire 34a.

The precharge circuit 42a includes a bypass line 44a, a precharge switch 46a, and a precharge resistor 48a. The bypass line 44a is electrically connected to the first positive wire 34a so as to bypass the first switch 38a.

One end of the bypass line 44a is electrically connected to a first partial wire 35a of the first positive wire 34a. The first partial wire 35a electrically connects the positive terminal of the first power storage device 16a and one of the terminals of the first switch 38a. The other end of the bypass line 44a is electrically connected to a second partial wire 37a of the first positive wire 34a. The second partial wire 37a electrically connects the other of the terminals of the first switch 38a and the first positive power line 28a.

The precharge switch 46a and the precharge resistor 48a are provided in series on the bypass line 44a. One of the terminals of the precharge switch 46a is electrically connected to the first partial wire 35a. The other of the terminals of the precharge switch 46a is electrically connected to the second partial wire 37a via the precharge resistor 48a. The precharge circuit 42a may include components (for example, various sensors, a fuse, a relay, a breaker, a diode, a transistor, a resistor, a coil, a capacitor, and the like) other than the above-described components, but the description thereof will be omitted here.

The second load device 14b is configured in the same manner as the first load device 14a. Therefore, the detailed description of the configuration of the second load device 14b will be omitted. It should be noted that the second load device 14b includes a smoothing capacitor 22b on the input side of the DC power. The second load device 14b may include a plurality of the smoothing capacitors 22b.

The second power storage device 16b is configured in the same manner as the first power storage device 16a. Therefore, the detailed description of the configuration of the second power storage device 16b will be omitted. It should be noted that a fuse (not shown) for interrupting a short-circuit current when the short-circuit current flows between a second positive wire 34b and a second negative wire 36b, which will be described later, may be provided inside the second power storage device 16b. Instead of the fuse, an element having a sufficient breaking current capacity (for example, a pyro-switch or the like) may be provided inside the second power storage device 16b.

The second power supply circuit 18b supplies DC power from the power generation device 12 to the second load device 14b. The second power supply circuit 18b supplies DC power from the second power storage device 16b to the second load device 14b.

The second power supply circuit 18b includes a second positive power line 28b, a second negative power line 30b, and an interrupting device 32b. One end of the second positive power line 28b is electrically connected to a partial positive power line 29a of the first positive power line 28a. The partial positive power line 29a electrically connects the positive terminal of the power generation device 12 and the interrupting device 32a. The other end of the second positive power line 28b is electrically connected to the positive terminal of the second load device 14b. One end of the second negative power line 30b is electrically connected to a partial negative power line 31*a*. The partial negative power line 31*a* electrically connects the negative terminal of the power generation device 12 and the interrupting device 32*a*. The other end of the second negative power line 30*b* is electrically connected to the negative terminal of the second load device 14*b*.

The interrupting device 32*b* includes a pair of switches (not shown). One of the switches of the interrupting device 32*b* is provided on the second positive power line 28*b*. The other of the switches of the interrupting device 32*b* is provided on the second negative power line 30*b*. The interrupting device 32*b* may include components (for example, various sensors, a fuse, a relay, a breaker, a diode, a transistor, a resistor, a coil, a capacitor, and the like) other than the above-described components, but the description thereof will be omitted here.

The second power supply circuit 18*b* further includes the second positive wire 34*b*, the second negative wire 36*b*, a first switch 38*b*, a second switch 40*b*, and a precharge circuit 42*b*. The second positive wire 34*b* electrically connects the positive terminal of the second power storage device 16*b* and the second positive power line 28*b*. The second negative wire 36*b* electrically connects the negative terminal of the second power storage device 16*b* and the second negative power line 30*b*.

The first switch 38*b* is provided on the second positive wire 34*b*. The second switch 40*b* is provided on the second negative wire 36*b*. The precharge circuit 42*b* precharges the smoothing capacitor 22*b* provided in the second load device 14*b*. The precharge circuit 42*b* is connected to the second positive wire 34*b*.

The precharge circuit 42*b* includes a bypass line 44*b*, a precharge switch 46*b*, and a precharge resistor 48*b*. The bypass line 44*b* is electrically connected to the second positive wire 34*b* so as to bypass the first switch 38*b*.

One end of the bypass line 44*b* is electrically connected to a first partial wire 35*b* of the second positive wire 34*b*. The first partial wire 35*b* electrically connects the positive terminal of the second power storage device 16*b* and one of the terminals of the first switch 38*b*. The other end of the bypass line 44*b* is electrically connected to a second partial wire 37*b* of the second positive wire 34*b*. The second partial wire 37*b* electrically connects the other of the terminals of the first switch 38*b* and the second positive power line 28*b*.

The precharge switch 46*b* and the precharge resistor 48*b* are provided in series on the bypass line 44*b*. One of the terminals of the precharge switch 46*b* is electrically connected to the first partial wire 35*b*. The other of the terminals of the precharge switch 46*b* is electrically connected to the second partial wire 37*b* via the precharge resistor 48*b*. The precharge circuit 42*b* may include components (for example, various sensors, a fuse, a relay, a breaker, a diode, a transistor, a resistor, a coil, a capacitor, and the like) other than the above-described components, but the description thereof will be omitted here.

The power supply system 10 further includes a first containment member 50*a*, a temperature sensor 52*a*, a second containment member 50*b*, and a temperature sensor 52*b*. The first containment member 50*a* is a protective case that accommodates the first power storage device 16*a*. The first containment member 50*a* covers the entire first power storage device 16*a*. The material of the first containment member 50*a* has heat resistance, fire resistance, and thermally insulating properties. That is, the first containment member 50*a* prevents a fire that has occurred in the interior of the first containment member 50*a* from spreading to the exterior of the first containment member 50*a*. The second switch 40*a* is disposed in the interior of the first containment member 50*a*. The first switch 38*a* and the precharge circuit 42*a* are disposed on the exterior of the first containment member 50*a*.

The temperature sensor 52*a* can sequentially measure the temperature in the interior of the first containment member 50*a*. Specifically, the temperature sensor 52*a* can sequentially measure the temperature of the first power storage device 16*a*. The temperature sensor 52*a* may be disposed in the interior of the first containment member 50*a*.

The second containment member 50*b* is a protective case that accommodates the second power storage device 16*b*. The second containment member 50*b* covers the entire second power storage device 16*b*. The material of the second containment member 50*b* has heat resistance, fire resistance, and thermally insulating properties. That is, the second containment member 50*b* prevents a fire that has occurred in the interior of the second containment member 50*b* from spreading to the exterior of the second containment member 50*b*. The second switch 40*b* is disposed in the interior of the second containment member 50*b*. The first switch 38*b* and the precharge circuit 42*b* are disposed on the exterior of the second containment member 50*b*.

The temperature sensor 52*b* can sequentially measure the temperature in the interior of the second containment member 50*b*. Specifically, the temperature sensor 52*b* can sequentially measure the temperature of the second power storage device 16*b*. The temperature sensor 52*b* may be disposed in the interior of the second containment member 50*b*.

FIG. 2 is a control block diagram of a control device 60. As shown in FIG. 2, the power supply system 10 further includes the control device (ECU) 60. The control device 60 is preferably disposed on the exterior of the first containment member 50*a* and the second containment member 50*b*. In this case, even if a fire occurs in the interior of the first containment member 50*a* or the second containment member 50*b*, the fire can be prevented from spreading to the control device 60. A low-voltage power storage device (not shown) different from the first power storage device 16*a* and the second power storage device 16*b* supplies electric power for operating the control device 60, and the switches of the interrupting devices 32*a* and 32*b* and the like. This power storage device is disposed on the exterior of the first containment member 50*a* and the second containment member 50*b*. As a result, even if a fire occurs in the interior of the first containment member 50*a* or the second containment member 50*b*, it is possible to suppress the supply of electric power to the control device 60 from being stopped. The temperature sensor 52*a* sequentially supplies information indicating the temperature in the interior of the first containment member 50*a* to the control device 60. The temperature sensor 52*b* sequentially supplies information indicating the temperature in the interior of the second containment member 50*b* to the control device 60.

The control device 60 includes a computation unit 62 and a storage unit 64. The computation unit 62 may be constituted by a processor such as a central processing unit (CPU) or a graphics processing unit (GPU). That is, the computation unit 62 is constituted by processing circuitry.

The computation unit 62 includes a control unit 66 and an abnormality detection unit 68. The control unit 66 controls the entire power supply system 10. The control unit 66 controls the operations of the interrupting devices 32*a* and 32*b*, the first switches 38*a* and 38*b*, the second switches 40*a* and 40*b*, and the precharge switches 46*a* and 46*b*. The interrupting devices 32*a* and 32*b* are placed in a conductive state when receiving a signal from the control device 60, and are placed in an interruption state when not receiving a signal from the control device 60. The first switches 38a and 38b, the second switches 40a and 40b, and the precharge switches 46a and 46b are turned on when receiving a signal from the control device 60, and are turned off when not receiving a signal from the control device 60.

The abnormality detection unit 68 detects an abnormality in the interior of the first containment member 50a based on the information supplied from the temperature sensor 52a. The abnormality detection unit 68 detects an abnormality in the interior of the second containment member 50b based on the information supplied from the temperature sensor 52b.

The control unit 66 and the abnormality detection unit 68 can be realized by the computation unit 62 executing a program stored in the storage unit 64. It should be noted that at least part of the control unit 66 and the abnormality detection unit 68 may be realized by an integrated circuit such as an application specific integrated circuit (ASIC) or a field-programmable gate array (FPGA). Further, at least part of the control unit 66 and the abnormality detection unit 68 may be constituted by an electronic circuit including a discrete device.

The storage unit 64 is constituted by a volatile memory (not shown) and a non-volatile memory (not shown). Examples of the volatile memory include, for example, a random access memory (RAM) or the like. The volatile memory is used as a working memory of the processor and temporarily stores data and the like required for processing or computation. Examples of the non-volatile memory include, for example, a read only memory (ROM), a flash memory, or the like. The non-volatile memory is used as a storage memory and stores programs, tables, maps, and the like. At least part of the storage unit 64 may be included in the processor, the integrated circuit, or the like described above.

Figure 3:
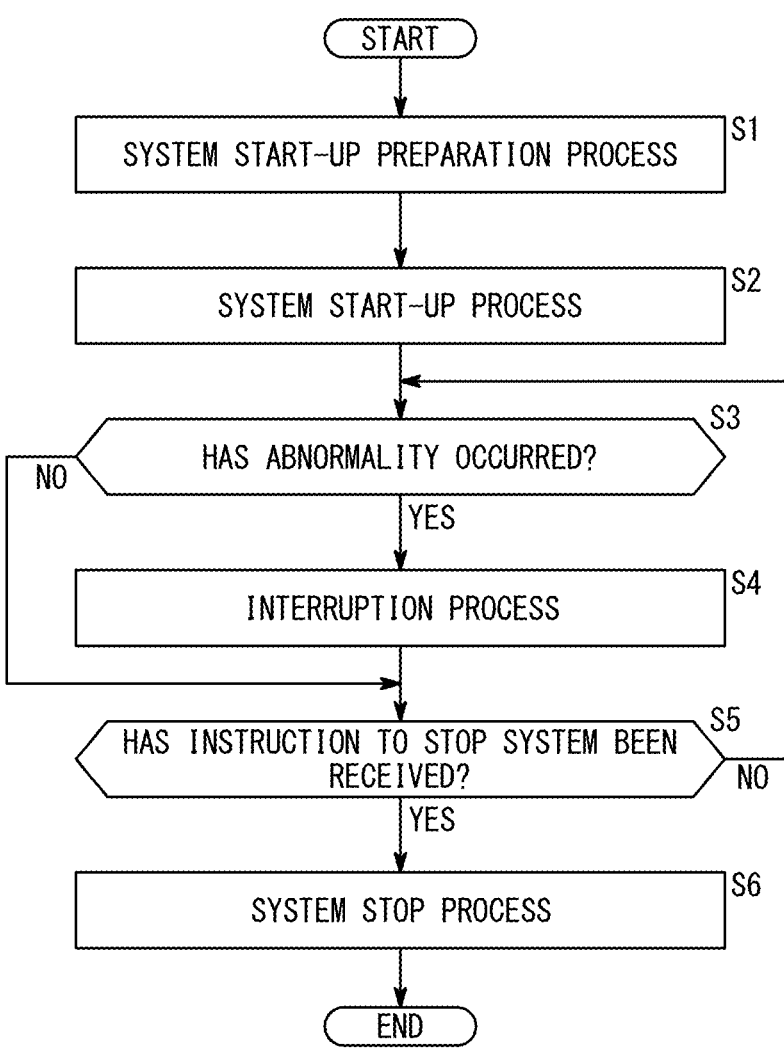
FIG. 3 is a flowchart for explaining an operation of the power supply system.
Figure 4:
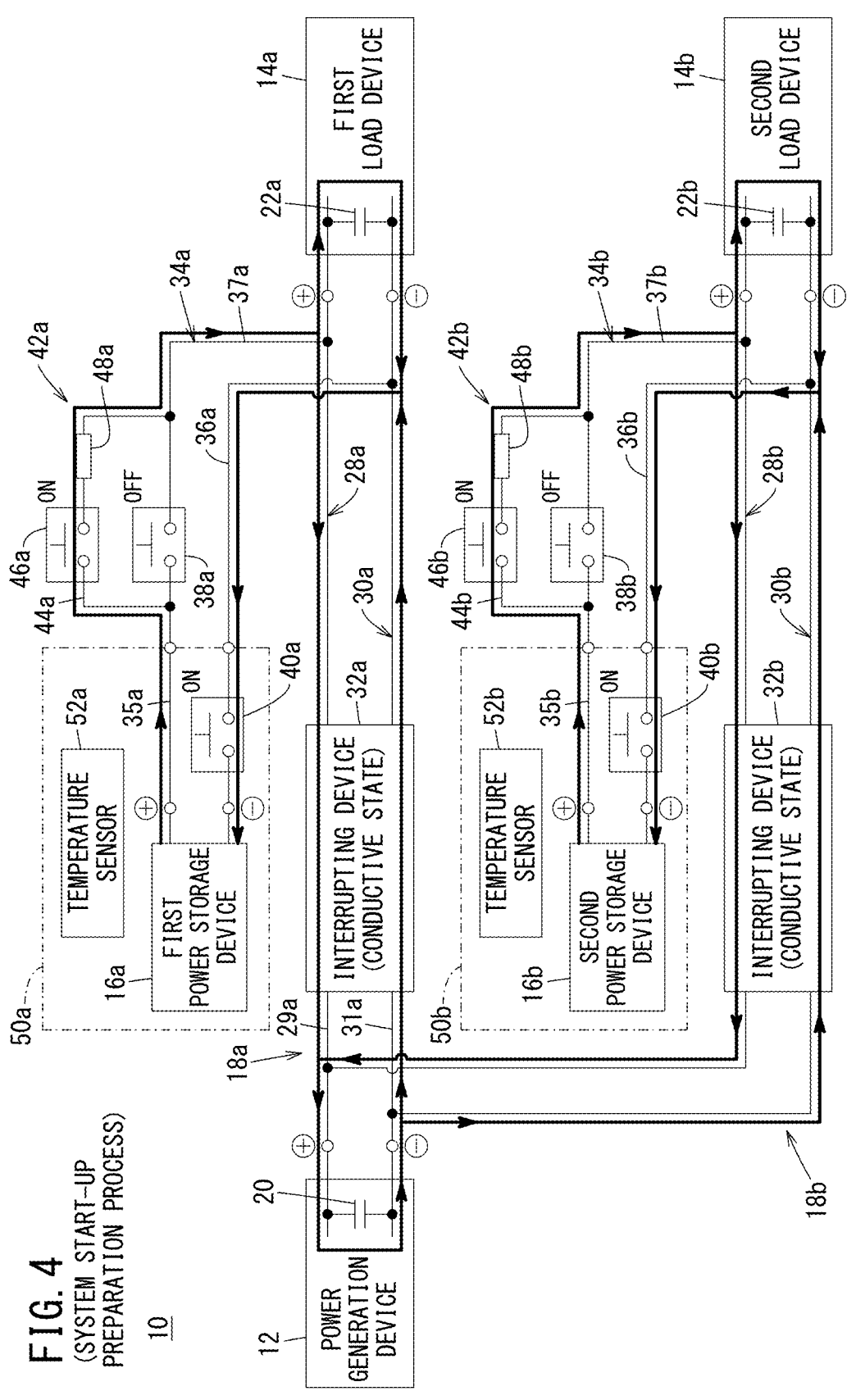
FIG. 4 is an explanatory diagram of the operation of the power supply system.
Figure 5:
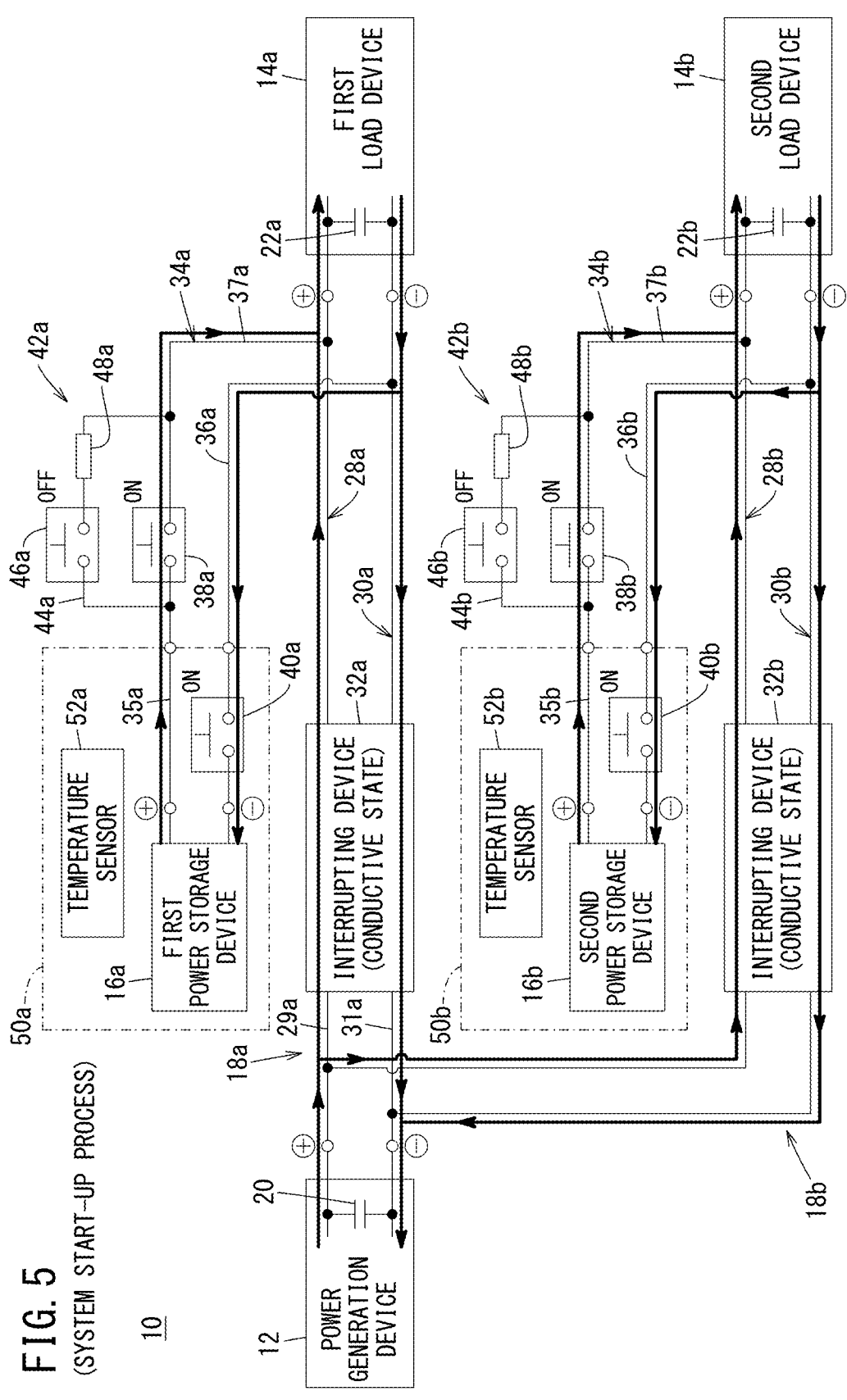
FIG. 5 is an explanatory diagram of the operation of the power supply system.
Figure 6:
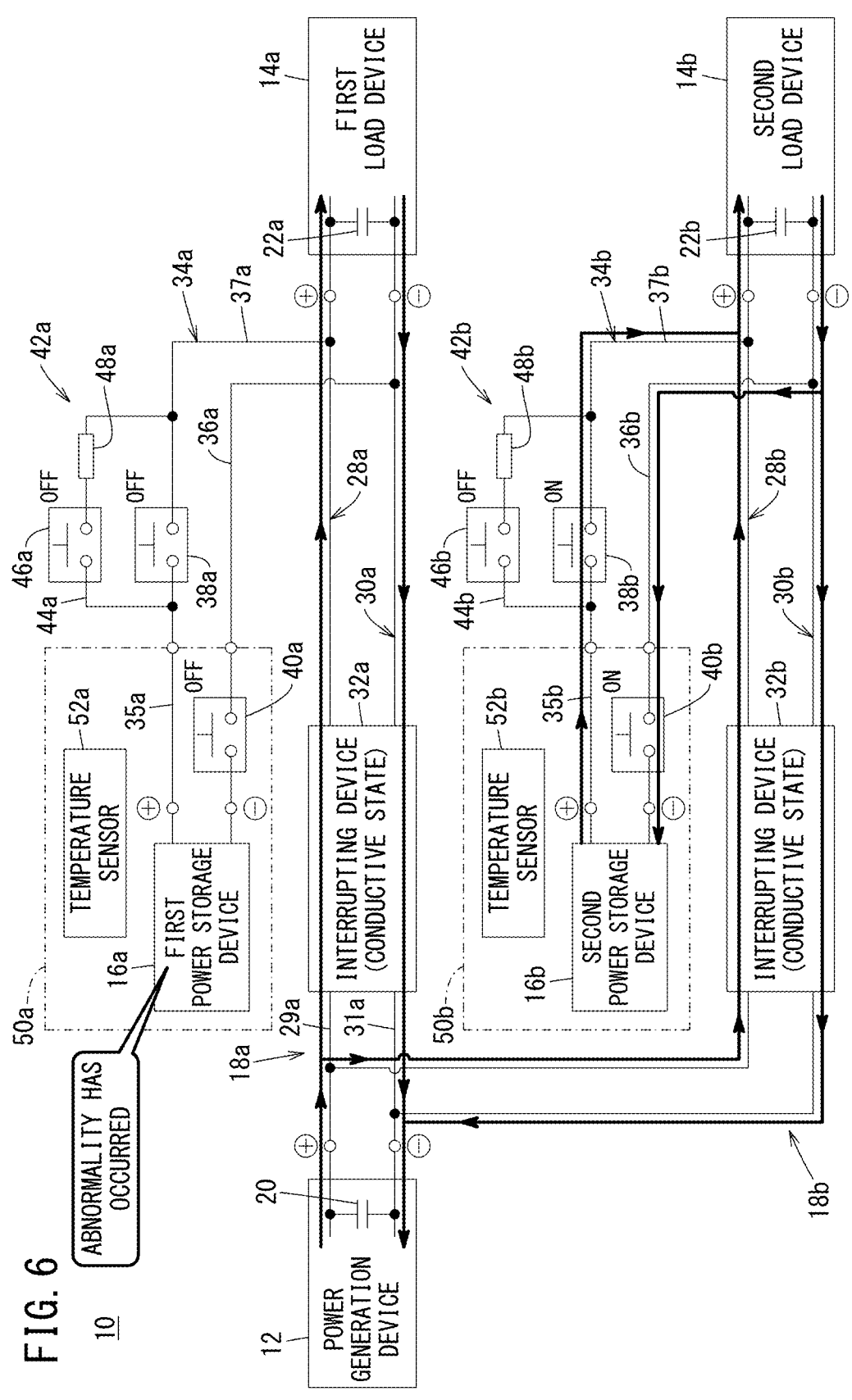
FIG. 6 is an explanatory diagram of the operation of the power supply system.

Next, the operation of the power supply system 10 will be described. FIG. 3 is a flowchart for explaining the operation of the power supply system 10. FIGS. 4 to 6 are explanatory diagrams of the operation of the power supply system 10. For example, when a user manually turns on a power switch or the like (not shown), the control unit 66 starts the power supply system 10.

Then, in step S1 of FIG. 3, the control unit 66 performs a system start-up preparation process. Specifically, as shown in FIG. 4, the control unit 66 places each of the interrupting devices 32a and 32b in the conductive state. That is, the control unit 66 turns on the pair of switches of each of the interrupting devices 32a and 32b. The control unit 66 turns off the first switches 38a and 38b, and turns on the second switches 40a and 40b and the precharge switches 46a and 46b.

As a result, an RC circuit including the first power storage device 16a, the precharge switch 46a, the precharge resistor 48a, the interrupting device 32a, the smoothing capacitor 20 of the power generation device 12, and the second switch 40a is formed. In addition, an RC circuit including the first power storage device 16a, the precharge switch 46a, the precharge resistor 48a, the smoothing capacitor 22a of the first load device 14a, and the second switch 40a is formed.

Further, an RC circuit including the second power storage device 16b, the precharge switch 46b, the precharge resistor 48b, the interrupting device 32b, the smoothing capacitor 20 of the power generation device 12, and the second switch 40b is formed. In addition, an RC circuit including the second power storage device 16b, the precharge switch 46b, the precharge resistor 48b, the smoothing capacitor 22b of the second load device 14b, and the second switch 40b is formed.

As a result, the current flows through the paths indicated by the arrows in FIG. 4. The smoothing capacitor 20 of the power generation device 12 is supplied with DC power from the first power storage device 16a via the precharge resistor 48a, and is supplied with DC power from the second power storage device 16b via the precharge resistor 48b. Electric charges are accumulated in the smoothing capacitor 20, and thus the smoothing capacitor 20 is charged. The smoothing capacitor 22a of the first load device 14a is supplied with DC power from the first power storage device 16a via the precharge resistor 48a. Electric charges are accumulated in the smoothing capacitor 22a, and thus the smoothing capacitor 22a is charged. The smoothing capacitor 22b of the second load device 14b is supplied with DC power from the second power storage device 16b via the precharge resistor 48b. Electric charges are accumulated in the smoothing capacitor 22b, and thus the smoothing capacitor 22b is charged. When the smoothing capacitors 20, 22a, and 22b each reach a predetermined voltage, the system start-up preparation process is completed. Thereafter, the process proceeds to step S2.

In step S2, the control unit 66 performs a system start-up process. As shown in FIG. 5, the control unit 66 maintains the interrupting devices 32a and 32b in the conductive state. Further, the control unit 66 turns off the precharge switches 46a and 46b, and turns on the first switches 38a and 38b. The control unit 66 maintains the second switches 40a and 40b in the ON state.

Then, at least one of the power generation device 12 or the first power storage device 16a can supply DC power to the first load device 14a. Further, at least one of the power generation device 12 or the second power storage device 16b can supply DC power to the second load device 14b. Thereafter, the process proceeds to step S3.

In step S3, the abnormality detection unit 68 determines whether or not an abnormality has occurred in at least one of the interior of the first containment member 50a or the interior of the second containment member 50b. Specifically, the abnormality detection unit 68 determines that an abnormality (for example, a fire) has occurred in the interior of the first containment member 50a in a case where the temperature supplied from the temperature sensor 52a exceeds a predetermined abnormal temperature. Further, the abnormality detection unit 68 determines that an abnormality (for example, a fire) has occurred in the interior of the second containment member 50b in a case where the temperature supplied from the temperature sensor 52b exceeds a predetermined abnormal temperature.

In a case where the abnormality detection unit 68 determines that an abnormality has occurred in at least one of the interior of the first containment member 50a or the interior of the second containment member 50b (YES in step S3), the process proceeds to step S4. In a case where the abnormality detection unit 68 determines that no abnormality has occurred in any of the interior of the first containment member 50a or the interior of the second containment member 50b (NO in step S3), the process proceeds to step S5.

In step S4, the control unit 66 performs an interruption process. Specifically, as shown in FIG. 6, in a case where an abnormality has occurred in the interior of the first containment member 50a, the control unit 66 turns off the first switch 38a and the second switch 40a. As a result, the first power storage device 16a is electrically disconnected from the first positive power line 28a and the first negative power line 30a. Therefore, for example, even in a case where the insulating coating of each of the first positive wire 34a and the first negative wire 36a is melted in the interior of the first containment member 50a, and the first positive wire 34a and the first negative wire 36a are short-circuited, no current flows from the power generation device 12 and the second power storage device 16b to the short-circuited portion. It should be noted that, when the first positive wire 34a and the first negative wire 36a are short-circuited in the interior of the first containment member 50a, for example, a fuse inside the first power storage device 16a is melted, and therefore, a short-circuit current does not flow through the short-circuited portion.

In this case, DC power is supplied from the power generation device 12 to the first load device 14a. Therefore, the supply of DC power to the first load device 14a is not interrupted. That is, even if an abnormality has occurred in the interior of the first containment member 50a, DC power can be continuously supplied to the first load device 14a and the second load device 14b. Although detailed illustration and description are omitted, in a case where an abnormality has occurred in the interior of the second containment member 50b, the control unit 66 turns off the first switch 38b and the second switch 40b. This provides the same operational effects as those described above. Thereafter, the process proceeds to step S5.

In step S5, the control unit 66 determines whether or not an instruction to stop the system has been received. In a case where the control unit 66 determines that the instruction to stop the system has not been received (NO in step S5), the process proceeds to step S3. In a case where the control unit 66 determines that the instruction to stop the system has been received (YES in step S5), the process proceeds to step S6.

In step S6, the control unit 66 performs a system stop process. Specifically, the control unit 66 controls the operations of the interrupting devices 32a and 32b, the first switches 38a and 38b, the second switches 40a and 40b, and the precharge switches 46a and 46b to stop the supply of DC power to the first load device 14a and the second load device 14b. Thereafter, the process shown in FIG. 3 is completed.

Figure 7:
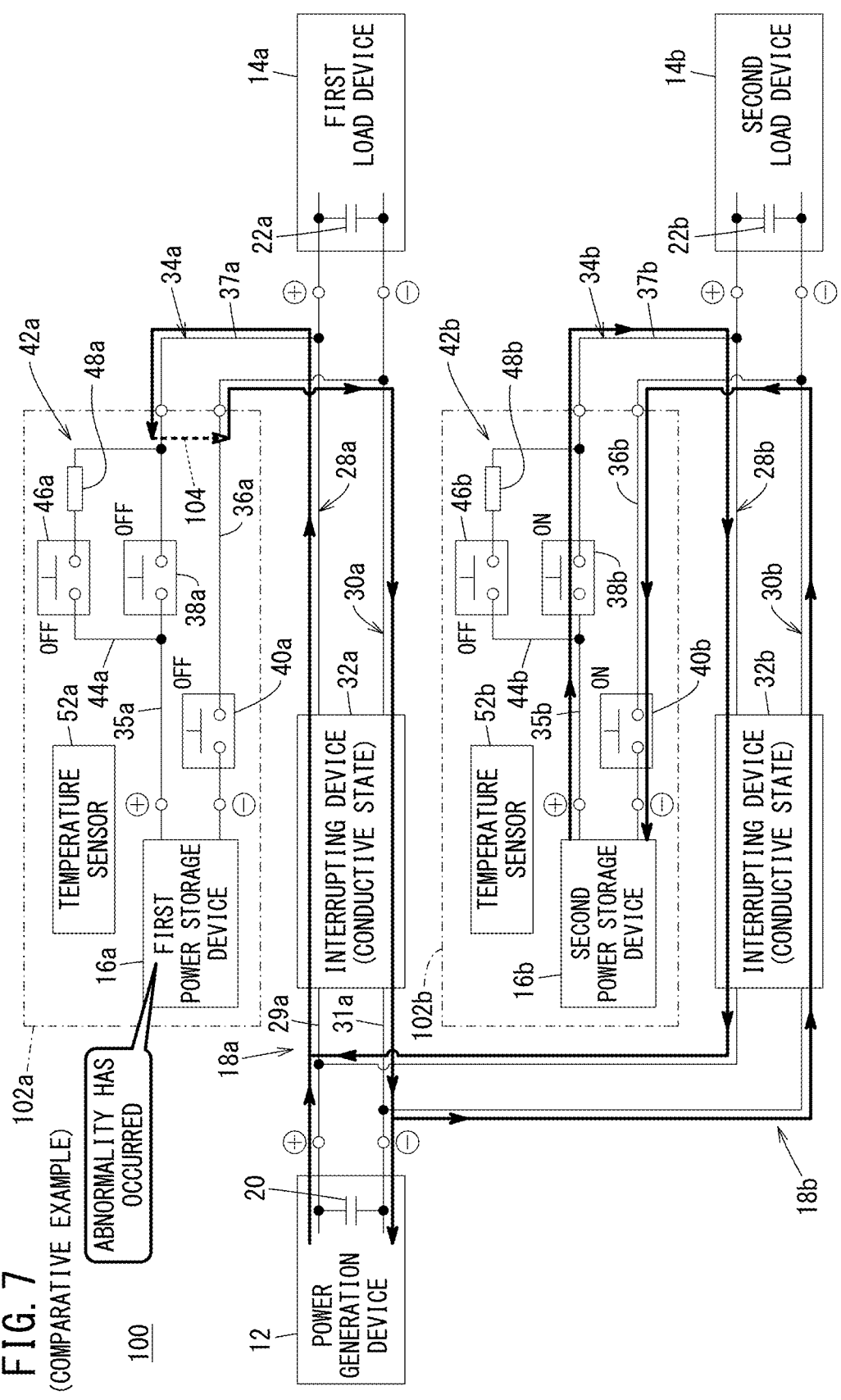
FIG. 7 is an explanatory diagram of an operation of a power supply system according to a comparative example.
Figure 8:
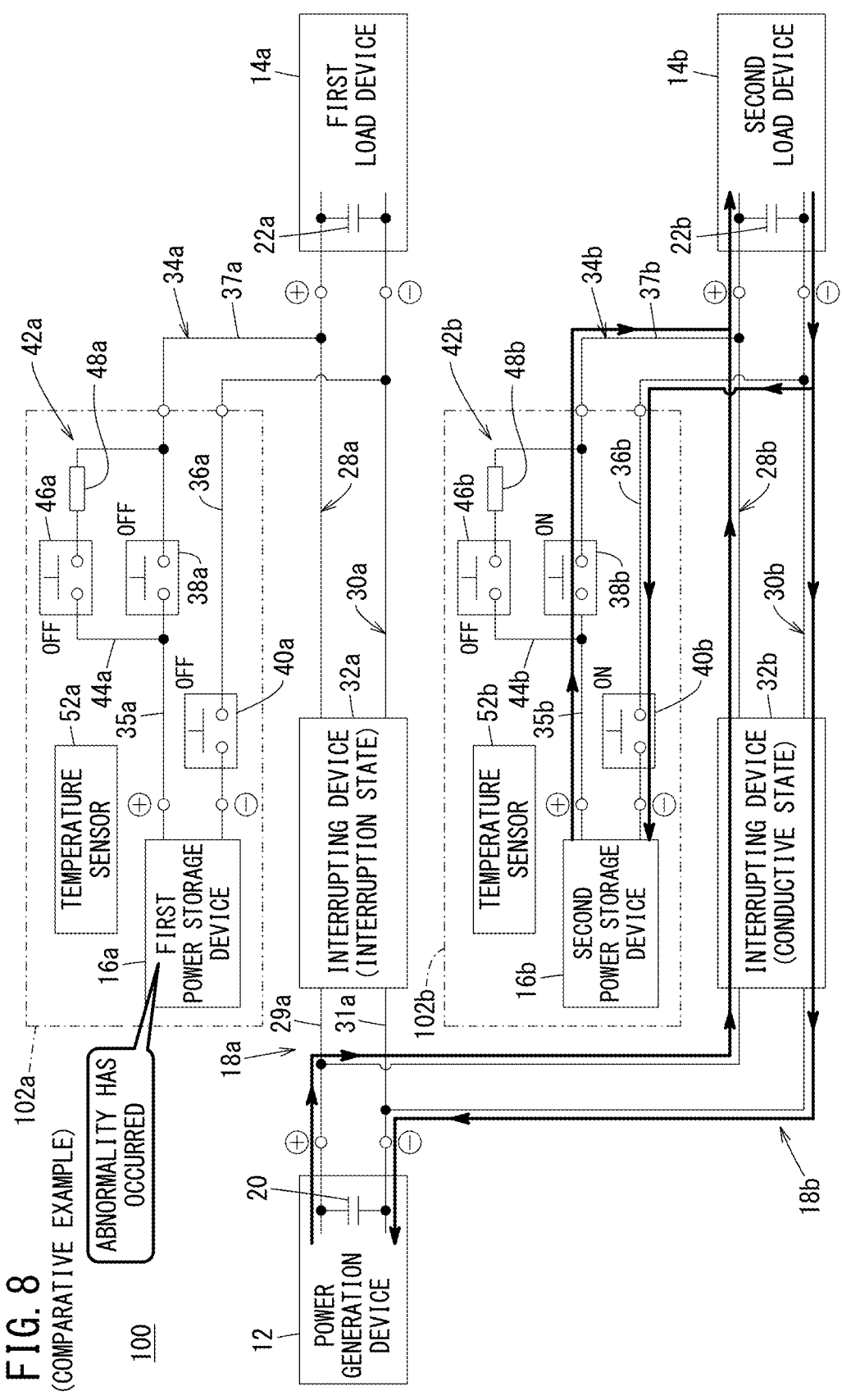
FIG. 8 is an explanatory diagram of the operation of the power supply system according to the comparative example.

Next, a power supply system 100 according to a comparative example will be described. FIGS. 7 and 8 are explanatory diagrams of the power supply system 100 according to the comparative example. As shown in FIG. 7, in the power supply system 100 according to the comparative example, the first switch 38a, the second switch 40a, and the precharge circuit 42a are disposed in the interior of a first containment member 102a, and the first switch 38b, the second switch 40b, and the precharge circuit 42b are disposed in the interior of a second containment member 102b. The other configurations of the power supply system 100 are the same as the configurations of the power supply system 10 described above.

In the power supply system 100, for example, when a fire has occurred in the interior of the first containment member 102a, the first power storage device 16a, the first switch 38a, the second switch 40a, and the precharge circuit 42a disposed in the interior of the first containment member 102a may be lost entirely. In addition, since the size of the first containment member 102a needs to be relatively large, the overall size of the power supply system 100 is also likely to be large.

Furthermore, for example, a short-circuited portion 104 shown in FIG. 7 may be generated in the interior of the first containment member 102a. The short-circuited portion 104 is formed by the first positive wire 34a and the first negative wire 36a being electrically connected in the interior of the first containment member 102a. In this case, even if the control unit 66 turns off the first switch 38a and the second switch 40a, a short-circuit current flows from the power generation device 12 and the second power storage device 16b to the short-circuited portion 104. Then, DC power is not supplied any more to the first load device 14a and the second load device 14b.

In such a case, as shown in FIG. 8, the control unit 66 can place the interrupting device 32a in the interruption state. As a result, DC power is supplied from the power generation device 12 and the second power storage device 16b to the second load device 14b. However, since the DC power is not supplied to the first load device 14a, the first load device 14a cannot be driven.

According to the present embodiment, the first switch 38a and the precharge circuit 42a are disposed on the exterior of the first containment member 50a, and the second switch 40a is disposed in the interior of the first containment member 50a. Therefore, even in a case where a fire has occurred in the interior of the first containment member 50a, the first switch 38a and the precharge circuit 42a can be prevented from being lost. Further, the first switch 38b and the precharge circuit 42b are disposed on the exterior of the second containment member 50b, and the second switch 40b is disposed in the interior of the second containment member 50b. Therefore, even in a case where a fire has occurred in the interior of the second containment member 50b, the first switch 38b and the precharge circuit 42b can be prevented from being lost. Further, since the size of each of the first containment member 50a and the second containment member 50b can be made relatively small, the overall size of the power supply system 10 can be made compact. This makes it possible to obtain a more satisfactory power supply system 10.

Further, for example, even in a case where the first positive wire 34a and the first negative wire 36a are short-circuited in the interior of the first containment member 50a, the first switch 38a disposed on the exterior of the first containment member 50a is turned off, whereby it is possible to prevent a short-circuit current from flowing from the power generation device 12 and the second power storage device 16b to the short-circuited portion in the interior of the first containment member 50a. Therefore, the supply of DC power to the first load device 14a is not interrupted.

Figure 9:
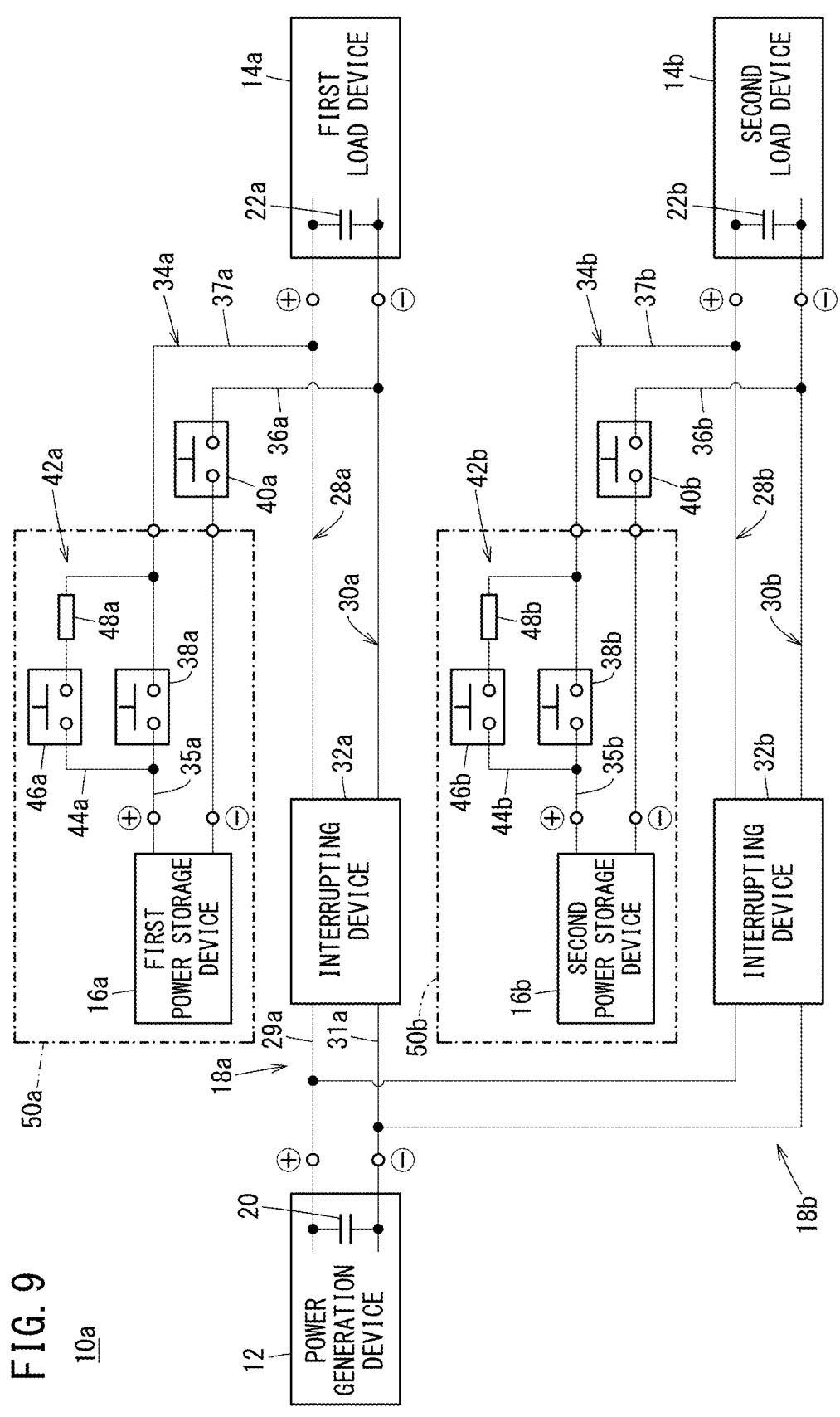
FIG. 9 is a schematic diagram of a power supply system according to a modification.

Next, a power supply system 10a according to a modification will be described. FIG. 9 is a schematic diagram of the power supply system 10a according to the modification. As shown in FIG. 9, in the power supply system 10a, the first switch 38a and the precharge circuit 42a are disposed in the interior of the first containment member 50a, and the second switch 40a is disposed on the exterior of the first containment member 50a. In addition, in the power supply system 10a, the first switch 38b and the precharge circuit 42b are disposed in the interior of the second containment member 50b, and the second switch 40b is disposed on the exterior of the second containment member 50b. The power supply system 10a provides the same advantages and effects as those of the power supply system 10 described above.

The power supply system 10, 10a is not limited to having the above-described configurations. The power supply system 10, 10a may include a first backflow prevention device that restricts the supply of electric power from the first power storage device 16a to the power generation device 12, and a second backflow prevention device that restricts the supply of electric power from the second power storage device 16*b* to the power generation device 12. These back-flow prevention devices are located on the exterior of each of the first containment member 50*a* and the second containment member 50*b*. The detailed description of the configurations of the backflow prevention devices will be omitted.

The power supply system 10, 10*a* may include sensors for detecting heat, smoke, flame, or the like generated in the interior of the first containment member 50*a*, and sensors for detecting heat, smoke, flame, or the like generated in the interior of the second containment member 50*b*. In this case, the abnormality detection unit 68 can determine whether or not a fire has occurred in the interior of the first containment member 50*a* or in the interior of the second containment member 50*b* based on information supplied from these sensors.

For example, the abnormality detection unit 68 may detect a high temperature abnormality or a low temperature abnormality of the first power storage device 16*a* and the second power storage device 16*b* based on information supplied from the temperature sensors 52*a* and 52*b*. The power supply system 10 may include a camera capable of photographing the interior of the first containment member 50*a* and the interior of the second containment member 50*b*. In this case, the abnormality detection unit 68 may detect an abnormality in the interior of the first containment member 50*a* and an abnormality in the interior of the second containment member 50*b* based on information supplied from the camera. The power supply system 10 may include a disconnection detector that detects disconnection of the first positive wire 34*a*, the second positive wire 34*b*, the first negative wire 36*a*, or the second negative wire 36*b* in the interior of the first containment member 50*a* and the interior of the second containment member 50*b*. In this case, the abnormality detection unit 68 can detect a disconnection abnormality in the interior of the first containment member 50*a* and a disconnection abnormality in the interior of the second containment member 50*b* based on information supplied from the disconnection detector. The abnormality detection unit 68 may detect a communication abnormality of the first power storage device 16*a* and the second power storage device 16*b*.

In the power supply system 10, 10*a*, the second load device 14*b*, the second power storage device 16*b*, the second power supply circuit 18*b*, the second containment member 50*b*, and the temperature sensor 52*b* may be omitted. Further, in the power supply system 10, 10*a*, the number of each of the power storage devices and the load devices is not limited to two, and three or more power storage devices and three or more load devices may be provided. Two or more power generation devices 12 may be provided.

Figure 10:
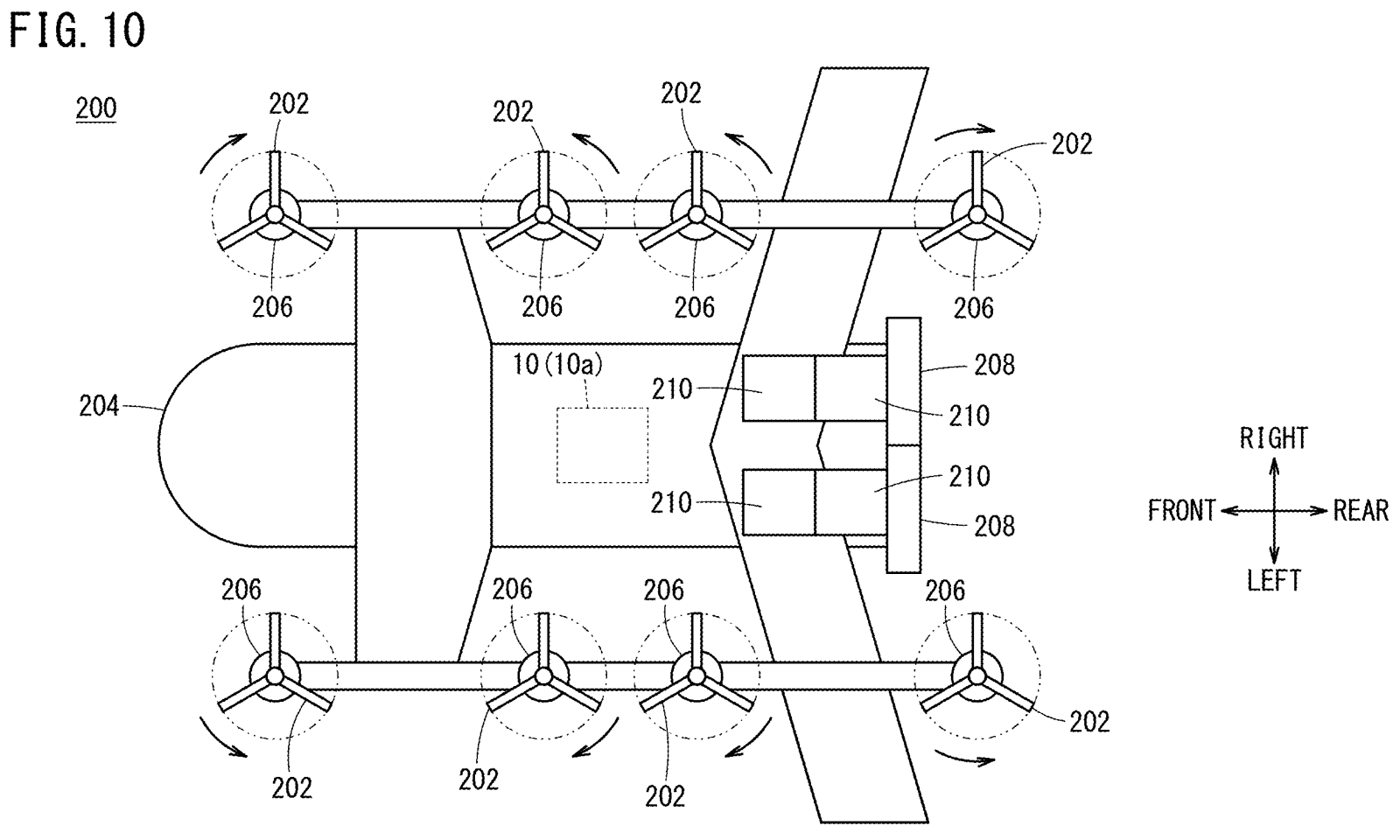

FIG. 10 is a schematic diagram of the moving object 200. As shown in FIG. 10, the power supply system 10, 10*a* can be mounted on the moving object 200. The moving object 200 is, for example, an electric vertical take-off and landing aircraft (eVTOL aircraft). The moving object 200 includes eight VTOL rotors 202. The VTOL rotors 202 generate upward thrust for a fuselage 204. The moving object 200 includes eight electric motors 206. One electric motor 206 drives one VTOL rotor 202. The moving object 200 includes two cruise rotors 208. The cruise rotors 208 generate forward thrust for the fuselage 204. The moving object 200 includes four electric motors 210. Two electric motors 210 drive one cruise rotor 208.

The precharge circuit 42*a* may be provided on the first negative wire 36*a*. The precharge circuit 42*b* may be provided on the second negative wire 36*b*.

Each of the first load device 14*a* and the second load device 14*b* may include at least one of the plurality of electric motors 206 and the plurality of electric motors 210. Each of the first load device 14*a* and the second load device 14*b* may include a low-voltage drive device in addition to the electric motor 206 and the electric motor 210.

The following supplementary notes are further disclosed in relation to the above-described embodiment.

Supplementary Note 1

The power supply system (10, 10*a*) of the present disclosure includes the power storage device (16*a*, 16*b*), the power supply circuit (18*a*, 18*b*) configured to supply DC power from the power storage device to the load device (14*a*, 14*b*), and the containment member (50*a*, 50*b*) configured to accommodate the power storage device, wherein the power supply circuit includes the positive wire (34*a*, 34*b*) and the negative wire (36*a*, 36*b*), the first switch (38*a*, 38*b*) provided on the positive wire, and the second switch (40*a*, 40*b*) provided on the negative wire, and one of the first switch or the second switch is disposed in the interior of the containment member, and another one of the first switch or the second switch is disposed on the exterior of the containment member.

According to such a configuration, one of the first switch or the second switch is disposed in the interior of the containment member, and the other one of the first switch or the second switch is disposed on the exterior of the containment member. Therefore, even in a case where an abnormality (for example, a fire) has occurred in the interior of the containment member, it is possible to suppress the loss of both the first switch and the second switch. In addition, since the size of the containment member can be made relatively small, the overall size of the power supply system can be made compact. This makes it possible to obtain a more satisfactory power supply system.

Supplementary Note 2

In the power supply system according to Supplementary Note 1, the power supply circuit may include the precharge circuit (42*a*, 42*b*) configured to precharge the smoothing capacitor (22*a*, 22*b*) provided in the load device, and the precharge circuit may be disposed on the exterior of the containment member.

According to such a configuration, even in a case where an abnormality (for example, a fire) has occurred in the interior of the containment member, it is possible to suppress the loss of the precharge circuit. Also, the size of the containment member can be made smaller.

Supplementary Note 3

The power supply system according to Supplementary Note 1 or 2 may further include the power generation device (12) connected to the power supply circuit in parallel with the power storage device.

According to such a configuration, even in a case where an abnormality (for example, a fire) has occurred in the interior of the containment member, the DC power can be supplied from the power generation device to the load device.

Supplementary Note 4

The power supply system according to any one of Supplementary Notes 1 to 3 may further include the control unit (66) configured to control the operation of each of the first switch and the second switch, and the control unit may be disposed on the exterior of the containment member.

According to such a configuration, even in a case where an abnormality (for example, a fire) has occurred in the interior of the containment member, the loss of the control unit can be suppressed, and therefore, the first switch and the second switch can be operated.

Supplementary Note 5

In the power supply system according to Supplementary Note 4, the control unit may turn off the other one of the first switch or the second switch in a case where an abnormality in the interior of the containment member is detected.

According to such a configuration, even in a case where the positive wire and the negative wire are short-circuited in the interior of the containment member, the other one of the first switch or the second switch is turned off, whereby it is possible to prevent a short-circuit current from flowing from another power supply device (the power generation device, the power storage device, or the like) to the short-circuited portion.

Supplementary Note 6

The moving object (200) of the present disclosure includes the power supply system according to any one of Supplementary Notes 1 to 5.

According to such a configuration, a more satisfactory moving object can be obtained.

Although the present disclosure has been described in detail, the present disclosure is not limited to the above-described individual embodiments. Various additions, replacements, modifications, partial deletions, and the like can be made to these embodiments without departing from the gist of the present disclosure or without departing from the gist of the present disclosure derived from the claims and equivalents thereof. Further, these embodiments can also be implemented in combination. For example, in the above-described embodiments, the order of operations and the order of processes are shown as examples, and are not limited to these. Furthermore, the same applies to a case where numerical values or mathematical expressions are used in the description of the above-described embodiments.

The invention claimed is:

1. A power supply system comprising:
a power storage device;
a power supply circuit configured to supply direct current power from the power storage device to a load device; and
a containment member configured to accommodate the power storage device,
wherein the power supply circuit includes:
a positive wire and a negative wire;

a first switch provided on the positive wire; and
a second switch provided on the negative wire, and
one of the first switch or the second switch is disposed in an interior of the containment member, and another one of the first switch or the second switch is disposed on an exterior of the containment member,
further comprising
a control unit configured to control an operation of each of the first switch and the second switch, wherein
the control unit turns off the another one of the first switch or the second switch disposed on the exterior of the containment member in a case where an abnormality in the interior of the containment member is detected.

2. The power supply system according to claim 1, wherein
the power supply circuit includes a precharge circuit configured to precharge a smoothing capacitor provided in the load device, and
the precharge circuit is disposed on the exterior of the containment member.

3. The power supply system according to claim 1, further comprising
a power generation device connected to the power supply circuit in parallel with the power storage device.

4. The power supply system according to claim 1, wherein
the control unit is disposed on the exterior of the containment member.

5. A moving object comprising the power supply system according to claim 1.

6. The power supply system according to claim 1, wherein
in the interior of the containment member, the one switch is provided only on one of the positive wire or the negative wire, and
on the exterior of the containment member, the another switch is provided only on the other of the positive wire or the negative wire.

7. The power supply system according to claim 1, wherein
the containment member is made from material that has heat resistance.

8. The power supply system according to claim 1, wherein
the power supply circuit includes a precharge circuit configured to precharge a smoothing capacitor provided in the load device, and
the precharge circuit is disposed in the interior of the containment member.

* * * * *